United States Patent [19]

Fujimoto et al.

[11] Patent Number: 5,057,764
[45] Date of Patent: Oct. 15, 1991

[54] IDLING ENGINE SPEED CONTROLLING APPARATUS FOR AN ENGINE

[75] Inventors: Takanori Fujimoto; Toshiro Hara, both of Himeji, Japan

[73] Assignee: Mitsubishi Denki Kabushiki Kaisha, Tokyo, Japan

[21] Appl. No.: 407,172

[22] Filed: Sep. 14, 1989

[30] Foreign Application Priority Data

Oct. 4, 1988 [JP] Japan .................. 63-251095

[51] Int. Cl.$^5$ .......................... F02D 41/16; H02J 7/14
[52] U.S. Cl. ...................... 322/14; 123/339; 290/40 C; 322/29; 322/38; 322/99
[58] Field of Search ............... 322/14, 28, 29, 38, 322/99; 290/40 R, 40 C, 40 B; 123/339

[56] References Cited

U.S. PATENT DOCUMENTS

| | | | |
|---|---|---|---|
| 4,527,112 | 7/1985 | Herman | 290/40 R X |
| 4,555,657 | 11/1985 | Kato et al. | 322/28 X |
| 4,682,044 | 7/1987 | Hotate et al. | 290/40 C X |
| 4,749,944 | 6/1988 | Okamoto | 322/99 X |
| 4,794,898 | 1/1989 | Kato | 123/339 |

FOREIGN PATENT DOCUMENTS 3343694 6/1984 Fed. Rep. of Germany .
59-5855 6/1984 Japan .

Primary Examiner—R. J. Hickey
Attorney, Agent, or Firm—Sughrue, Mion, Zinn, Macpeak and Seas

[57] ABSTRACT

An idling engine speed controlling apparatus for an engine having a generator driven by an engine to charge a battery, a switching means for controlling the supply and interruption of an exciting current to a field winding for the generator so that a voltage generated from the generator or a voltage of a battery becomes a predetermined level, a continuous detecting means for detecting a total excitation time of the field winding during each rotational time period, and a regulator means having a control unit responsive to an output of continuous detecting means for adjusting a quantity of intake air supplied to the engine by detecting an excitation time of the field winding for each time period of the engine.

5 Claims, 4 Drawing Sheets

IDLING ENGINE SPEED CONTROLLING APPARATUS FOR AN ENGINE

BACKGROUND OF THE INVENTION

1. Field of the Invention

The present invention relates to an idling engine speed controlling apparatus for an engine wherein a quantity of intake air supplied to the engine is corrected on the basis of an electric load.

2. Discussion of Background

A conventional idling engine speed controlling apparatus for an engine is disclosed in, for instance, Japanese Unexamined Patent Publication 5855/1980.

The apparatus disclosed in the publication is such that a generator is driven by an engine to charge a battery by the output of the generator; when a terminal voltage at the battery is lower than a reference value, a switching means is actuated to close a circuit extending from the battery to the field winding, and at the same time, a current is supplied to the field winding to continue generation of electric power so that the battery is charged.

Further, it is so adapted that pulses are generated by a pulse signal generating means so as to correspond to opening and closing operations by the switching means, a current is caused to flow to the field winding on the basis of the pulse signals, and when a time for flowing the current is longer than a predetermined time, a degree of opening of throttle valve disposed in the air passage of a carburetor is increased by a predetermined quantity. Namely, an amount of air supplied to the engine is controlled depending on errors between a target idling engine speed and an actual engine speed so that the engine revolution speed is kept to be a target speed.

In the conventional engine speed controlling apparatus having the construction described above, when an electric load such as a headlamp, an electric radiator fan and so on which are connected to a battery and consume a large amount of electric power is used, the load to the generator becomes large, whereby the engine revolution number is decreased. The decreased engine revolution number is restored to a normal revolution number by the above-mentioned control. However, since a response of control was slow in the conventional controlling apparatus, an engine stall sometimes takes place when an electric load was large.

In order to eliminate the above-mentioned problem, there has been proposed a method of correcting a quantity of intake air by detecting a plurality of switches of electric load as disclosed in, for instance, Japanese Unexamined Patent Publication 197449/1983. However, this method requires a switch and an input circuit corresponding to the number of electric load, hence it results in a complicated structure of the control apparatus.

SUMMARY OF THE INVENTION

It is an object of the present invention to provide an idling engine speed controlling apparatus for an engine capable of eliminating an engine stall and the delay of response of control, and capable of simplifying the structure.

The foregoing and other objects of the present invention have been attained by providing an idling engine speed controlling apparatus for an engine which comprises a generator driven by an engine to charge a battery, a switching means for controlling the supply and the interruption of an exciting current to a field winding for the generator so that a voltage generated from the generator or a voltage of the battery becomes a predetermined level, a control unit that includes a means for continuously detecting a total excitation time of the field winding, and intake air supplied to the engine during each rotational 360° time period of the engine.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
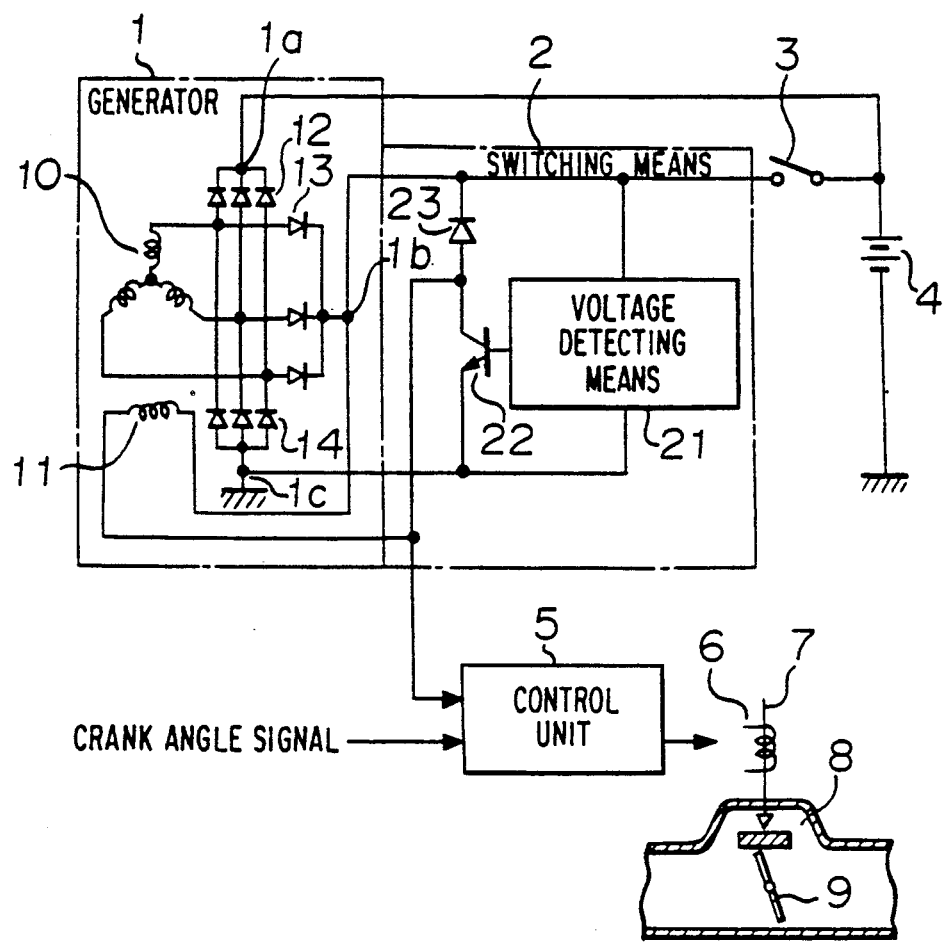
FIG. 1 is a diagram showing an embodiment of the overall construction of the idling engine speed controlling apparatus for an engine according to the present invention.

Referring to the drawings, wherein the same reference numerals designate the same or corresponding parts throughout the several views, and more particularly to FIG. 1 thereof, there is shown a diagram of a typical example of the idling engine speed controlling apparatus for an engine of the present invention. In FIG. 1, a reference numeral 1 designates a generator, a numeral 10 designates an armature winding having a star connection, a numeral 11 designates a field winding and numerals 12-14 designate diodes for rectifying a three phase a.c output from the armature winding 10. The generator 1 is constituted by the armature winding 10, the field winding 11 and the diodes 12-14. A main output terminal 1a of the generator 1 is connected to the positive pole of a battery 4, and the negative pole of the battery 4 is grounded.

An auxiliary output terminal 1b of the generator 1 is connected to the positive pole of the battery 4 through an engine switch 3.

A voltage detection circuit 21 is connected between an earth terminal 1c and the auxiliary output terminal 1b.

A numeral 2 designates a switching means for controlling the supply and the interruption of an exciting current to the field winding 11. The switching means 2 is constituted by the above-mentioned voltage detection circuit 21, a semiconductor switching element 22 (a transistor is used in this specified embodiment) and a diode 23.

The voltage detection circuit 21 is to detect a voltage of the battery 4 through the engine switch 3 so that an output detected by the detection circuit 21 is applied to the base of the semiconductor switching element 22.

The emitter of the semiconductor switching element 22 is connected to the earth terminal 1c. The collector of the switching element 22 is connected to the junction of the auxiliary output terminal 1b and the engine switch 3 through the diode 23.

The collector of the semiconductor switching element 22 is connected to the junction between a terminal of the field winding 11 and an input terminal of the control unit 5. The other terminal of the field winding is connected to the auxiliary output terminal 1b.

The other input terminal of the control unit 5 is so adapted to receive a crank angle signal. The control unit 5 receives an on-off signal (hereinbelow, referred to as an excitation signal) appearing at the connecting point of the field winding 11 and the semiconductor switching element 22 and the crank angle signal produced at a crank angle position of the engine so that an excitation time of the field winding (which corresponds to an ON time of the semiconductor switching element 22) in a predetermined interval between crank angles is detected, and a quantity of intake air to the engine is calculated on the basis of the result of the detection of the excitation time.

A numeral 6 designates a solenoid for opening and closing an electromagnetic valve 7 depending on a controlled value outputted from the control unit 5. By opening and closing the electromagnetic valve 7, opening and closing control of a by-pass 8 in a throttle valve 9 disposed in the intake air passage of the engine can be performed.

The voltage detection circuit 21 is constructed in such a manner that when it detects the voltage of the battery 4 (or the output voltage of the generator 1) being lower than a predetermined value, the semiconductor switching element 22 is turned on by the output of the voltage detection circuit 21, and when the voltage of the battery 4 becomes the predetermined value, the switching element 22 is caused to turn off.

When the switching element 22 is turned on, the diode 23 commutates a current flowing in the field winding 11.

Figure 2:
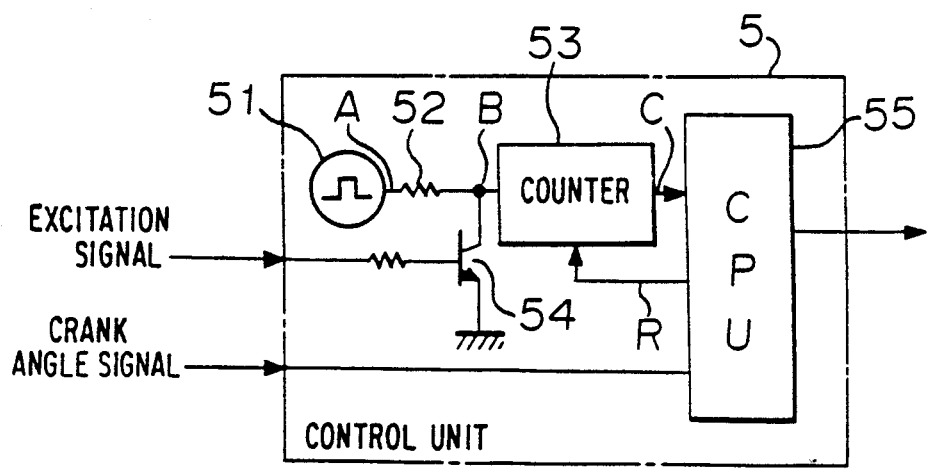
FIG. 2 is a block diagram of an embodiment of the inner structure of a control unit used for the controlling apparatus of the present invention.

FIG. 2 is a block diagram showing in more detail the inner structure of the control unit 5. In FIG. 2, a numeral 51 designates a pulse generator for generating a pulse train A at a predetermined frequency. The pulse train A is inputted to a counter 53 through a resistor 52. The pulse train A is also applied to the collector B of the transistor 54 which has the emitter grounded.

The above-mentioned excitation signal is inputted to the base of the transistor 54. Namely, the transistor 54 is turned off only when the excitation signal is not given, and the pulse train A appearing at the point B is inputted in the counter 53. Transistor 54 hence serves as a continuous excitation detection means. The output C of the counter 53 is supplied to a CPU 55, which reads the output C of the counter 53 each time the crank angle signal generates. An initializing signal R is generated from the CPU 55 to be entered in the counter 53.

Figure 3:
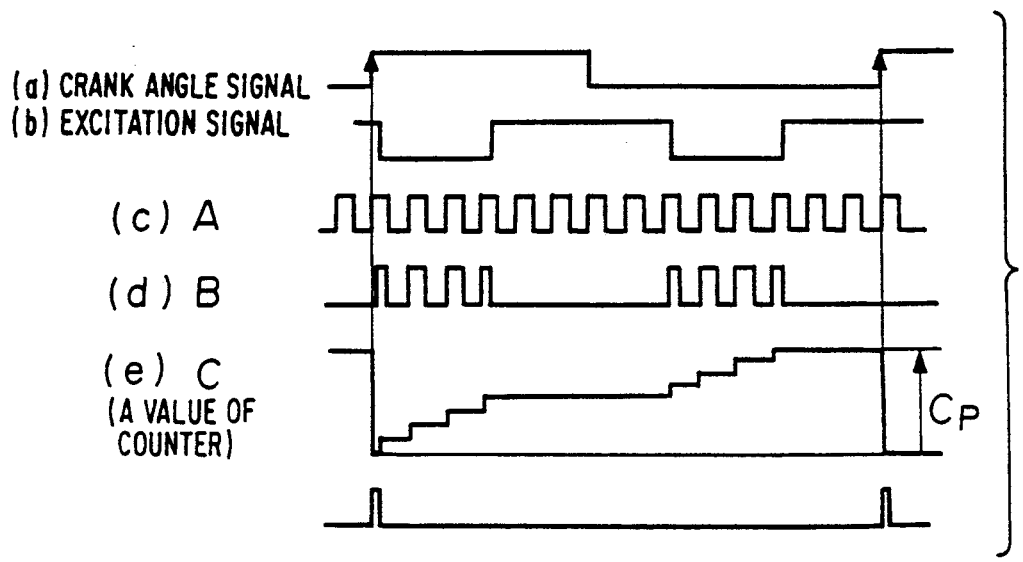
FIGS. 3 and 4 are respectively time charts showing the waveform of a signal at each part of the control unit.
Figure 4:
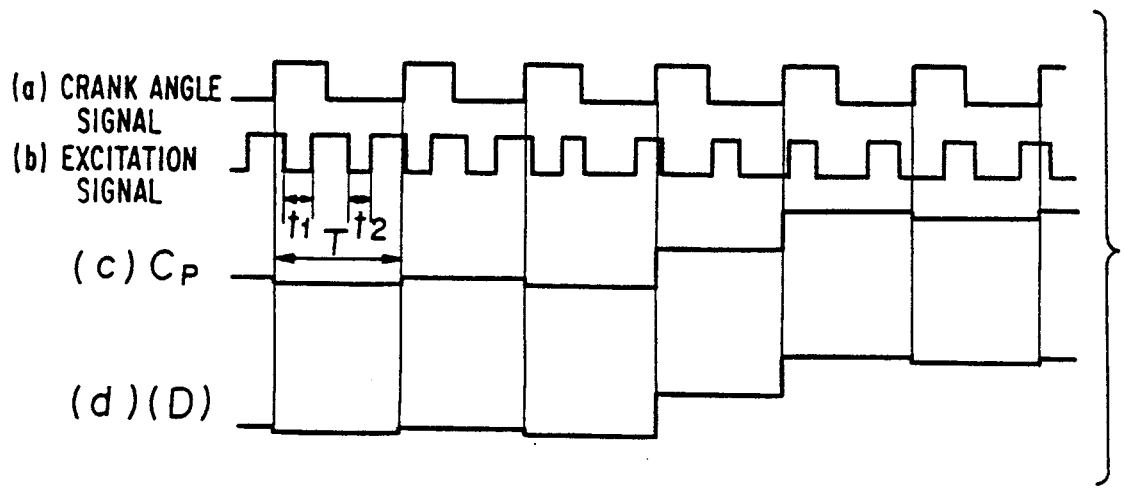

The operation of the idling engine speed controlling apparatus of the present invention will be described. Referring to FIGS. 2 and 3, description will be made as to the detection of a total excitation time of the field winding 11 in a predetermined interval between crank angles. FIG. 3 is a time chart showing the waveform of a signal at each part of the control unit 5 as shown in FIG. 2.

A pulse train A having a predetermined frequency is produced from the pulse generator 51 as shown in FIG. 3c, and the pulse train A is inputted in the counter 53 through the resistor 52.

On the other hand, the transistor 54 is in an OFF state in only non-conducting time periods of the excitation signal flowing in the field winding 11 (FIG. 3b), and pulses (FIG. 3d) appearing at the point B at the collector side of the transistor 54 are inputted in the counter 53.

The counter 53 counts the number of pulses and a counted value is supplied to the CPU 55 as shown in FIG. 3e. The CPU 55 reads the counted value (FIG. 3e) each time a crank angle signal generates (in this embodiment, at each time of rising the crank angle signal) as shown in FIG. 3a. The CPU 55 also outputs initializing signals R (FIG. 3f) to initialize the counter 53. As a result, the counted value is as shown in FIG. 3e. Thus, the counted value Cp read in the CPU 55 takes a value corresponding to an excitation time in a predetermined interval between crank angles.

Then, description will be made refering to FIGS. 4 to 8 show how a quantity of intake air to the engine is adjusted on the basis of the counted value Cp read by the CPU 55 and the crank angle signal (FIG. 3a).

Figure 5:
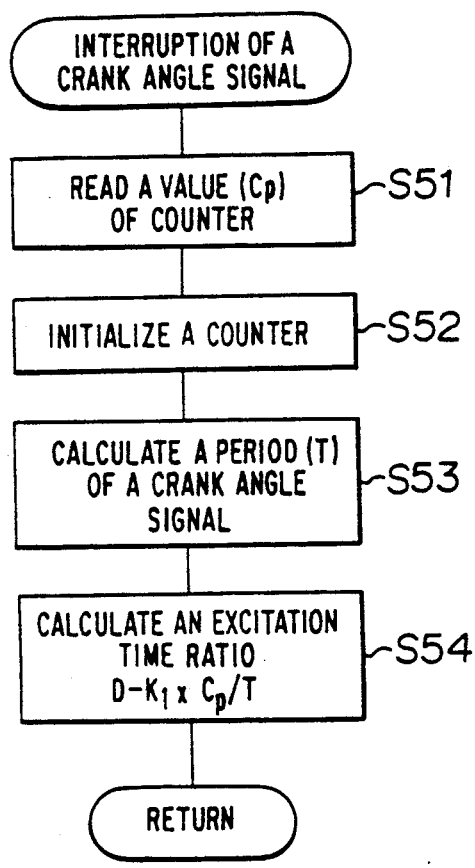
FIGS. 5 and 6 are respectively flow charts of programs showing the operational steps in a CPU in the control unit.
Figure 6:
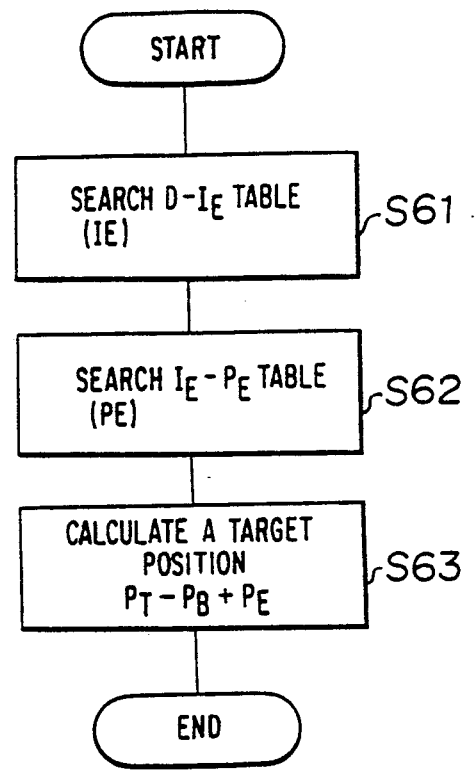
Figure 7:
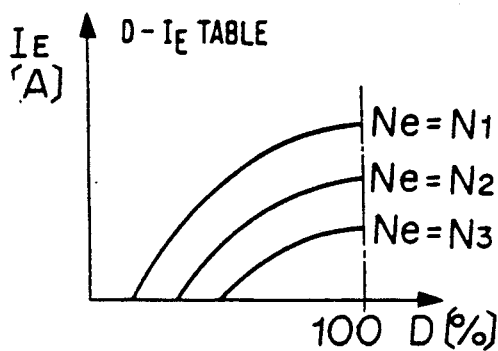
FIG. 7 is a diagram showing an excitation time ratio $D\text{-}I_E$ table searched by the flow chart of FIG. 5.
Figure 8:
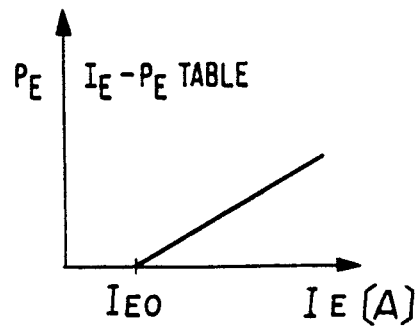
FIG. 8 is a diagram showing a generator output current $I_E$-correction quantity $P_E$ table searched by the flow chart of FIG. 6.

FIGS. 5 and 6 show the flow charts of programs for adjusting a quantity of the intake air by the CPU 55. According to controlling program, operations from the start to the end as in FIG. 6 is repeatedly executed. During the execution of the controlling program, the execution as in FIG. 6 is stopped when a crank angle signal is produced, and a crank angle signal interruption routine as in FIG. 5 is executed.

In the crank angle signal interruption routine of FIG. 5 which is executed at the generation of each crank angle signal as in FIG. 4a, the above-mentioned counted value Cp (FIG. 4c) is read at Step S51. Then, the counter 53 in the control unit 5 which is provided outside the controlling apparatus is initialized at Step S52. Namely, the counted value Cp read in the CPU 55 is renewed at each of the crank angle signals as shown in FIG. 4a, and the waveform as shown in FIG. 4c results.

Then, a period of crank angle signal T is measured at Step S53. At Step S54, an excitation time ratio D (FIG. 4d) to the period of crank angle signal is obtained from the following equation (1):

$$D = K_1 \times Cp/T \qquad (1)$$

where $K_1$ is a coefficient of transformation for transforming the excitation time ratio D into a predetermined resolving power.

Namely, the excitation time ratio D in the equation (1) means:

$$D \infty (t_1 + t_2)/T \qquad (2)$$

where $t_1$, $t_2$ are respectively excitation time in a crank cycle. The excitation time ratio D takes a value corresponding to an exciting current flowing in the field winding and it assumes a form as in FIG. 4d. When the above-mentioned steps are taken, the crank angle signal interruption routine is finished.

FIG. 6 shows a flow chart for obtaining a correction quantity $P_E$ obtained on the basis of the excitation time ratio D.

First of all, an output current $I_E$ from the generator 1 is searched by using an excitation time ratio D - $I_E$ table (FIG. 7) at Step S61. The output current $I_E$ in the table has a value corresponding to the output current of the generator 1.

The reason why the excitation time ratio D - $I_E$ table has an element of engine revolution speed Ne is that the excitation time ratio D corresponds to an exciting current flowing in the field winding 11, and $I_E$ corresponds to an output current from the generator 1.

Namely, it is because the output of the generator 1 is given by the intensity of the exciting current and the number of engine revolution.

Then, a correction quantity $P_E$ corresponding to the output current $I_E$ of the generator is searched by using a generator output current $I_E$ - correction quantity $P_E$ table (FIG. 8) at Step S62.

Data in the table is so determined that it is unnecessary to consider a correction quantity at a point $I_{EO}$ of generator output when there is electric load, and a correction quantity is gradually incrased as an electric load increases.

At Step S63, a correction quantity $P_E$ obtained at Step S63 is added to a basic quantity of control $P_B$ for controlling the quantity of intake air to obtain a final quantity of control $P_T$. Namely, the quantity of intake air to the engine is increased corresponding to the correction quantity $P_E$.

Figure 9:
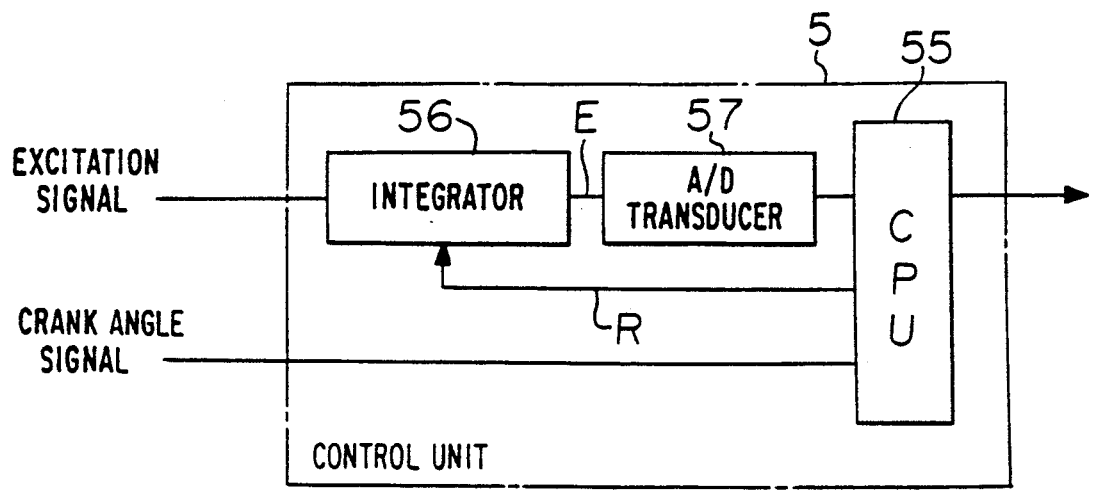
FIG. 9 is a block diagram of an embodiment of the inner structure of the control unit used for the idling engine speed controlling apparatus according to the present invention.
Figure 10:
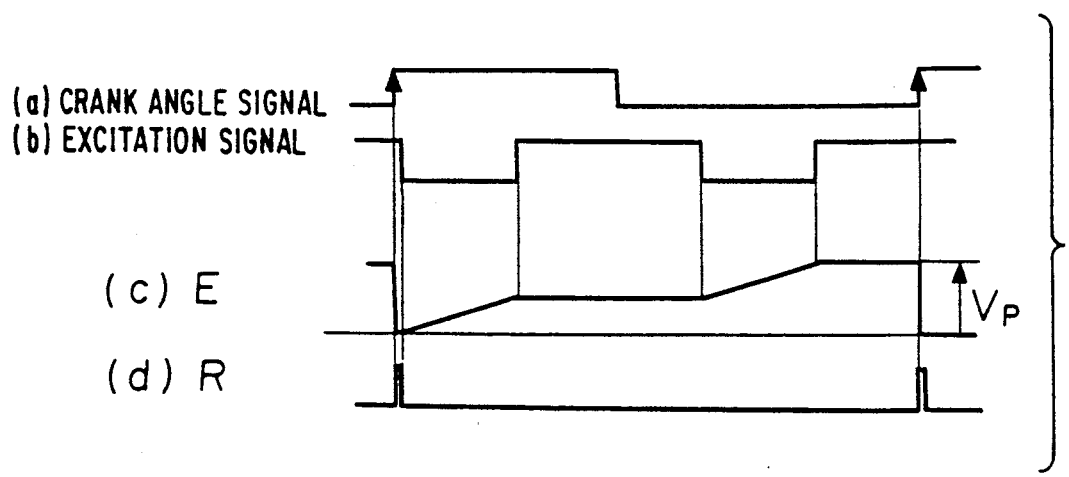
FIG. 10 is a flow chart showing the waveform of a signal at each part of the control unit as shown in FIG. 9.

FIG. 9 is a block diagram of another embodiment of the control unit 5 used for the controlling apparatus of the present invention, and FIG. 10 is a time chart showing the waveform of a signal at each part of the control unit as shown in FIG. 9.

In FIG. 9, a numeral 56 designates an integrator for integrating only an excitation time in an excitation signal, and a numeral 57 designates an A/D transducer for transducing the output of the integrator 56 into a digital value. A numeral 55 designates a CPU which reads the output of the A/D transducer 57 at the rising of the crank signal (FIG. 10a) and outputs an initializing signal R to initialize the integrator 56 (FIG. 10d). As a result, the output E of the integrator takes a waveform as shown in FIG. 10c, and an integrated output Vp (FIG. 10c) read in the CPU 55 takes a value corresponding to an excitation time in a predetermined interval between crank angles.

Thus, in accordance with the idling engine speed controlling apparatus of the present invention having the construction as above-mentioned, variations of the load of the engine due to increased electric loads can be correctly detected to thereby eliminate the disadvantage of decreasing of engine speed due to delay in response of control or an engine stall.

A correction quantity is determined on the basis of an excitation time for a predetermined crank cycle in consideration that the phase of the output of the generator is synchronizm with the phase of rotation, and the correction quantity can be obtained with high accuracy in a stable manner.

Obviously, numerous modifications and variations of the present invention are possible in light of the above teachings. It is therefore to be understood that within the scope of the appended claims, the invention may be practiced otherwise than as specifically described herein.

What is claimed is:

1. An idling engine speed controlling apparatus for an engine comprising:
   an electrical generator (1) driven by an engine to charge a battery (4),
   variable electrical load means for drawing current from said battery,
   an on-off switching means (2) for controlling the supply and interruption of an exciting current to a field winding (11) of said generator so that a voltage generated by said generator or a voltage of said battery is at a predetermined level,
   means (54) for continuously detecting a total excitation of said field winding during each 360° rotational time period of said engine, said total excitation being proportional to an instantaneous magnitude of said variable load means, and
   means (5-9) for regulating a quantity of intake air, supplied to said engine to attendantly adjust a speed of said engine and prevent an inordinate speed reduction or the stalling thereof, said regulating means including a control unit (5) responsive to an output of said continuous detecting means (54) during said 360° rotational time period of said engine.

2. The idling engine speed controlling apparatus according to claim 1, wherein said switching means (2) comprises a voltage detecting circuit (21) for detecting a voltage of said battery, a transistor (22) that is controlled by and turned on when said voltage detecting circuit detects a voltage in said battery that is lower than a predetermined value, and a diode (23) for commutating a current to said field winding when said transistor is turned on.

3. The idling engine speed controlling apparatus according to claim 1, wherein said control unit (5) includes a pulse generator (51) for outputting pulses and a counter (54) for counting said pulses,
   and wherein said regulating means detects a total excitation time for said field winding by counting a total number of pulses generated during that time when said field winding (11) is excited.

4. The idling engine speed controlling apparatus according to claim 1, wherein an excitation signal is outputted from said field winding (11) each time said field winding is excited, and said excitation signal is applied to said continuous detecting means (54) to detect an excitation for said field winding (11) by integrating said excitation signals.

5. The idling engine speed controlling apparatus according to claim 1, wherein said control unit (5) detects a total excitation of said field winding for a predetermined interval between crank angles.

* * * * *